May 18, 1937.　　A. PERRICH　　2,080,672
POULTRY FEEDING TROUGH
Filed Nov. 25, 1935
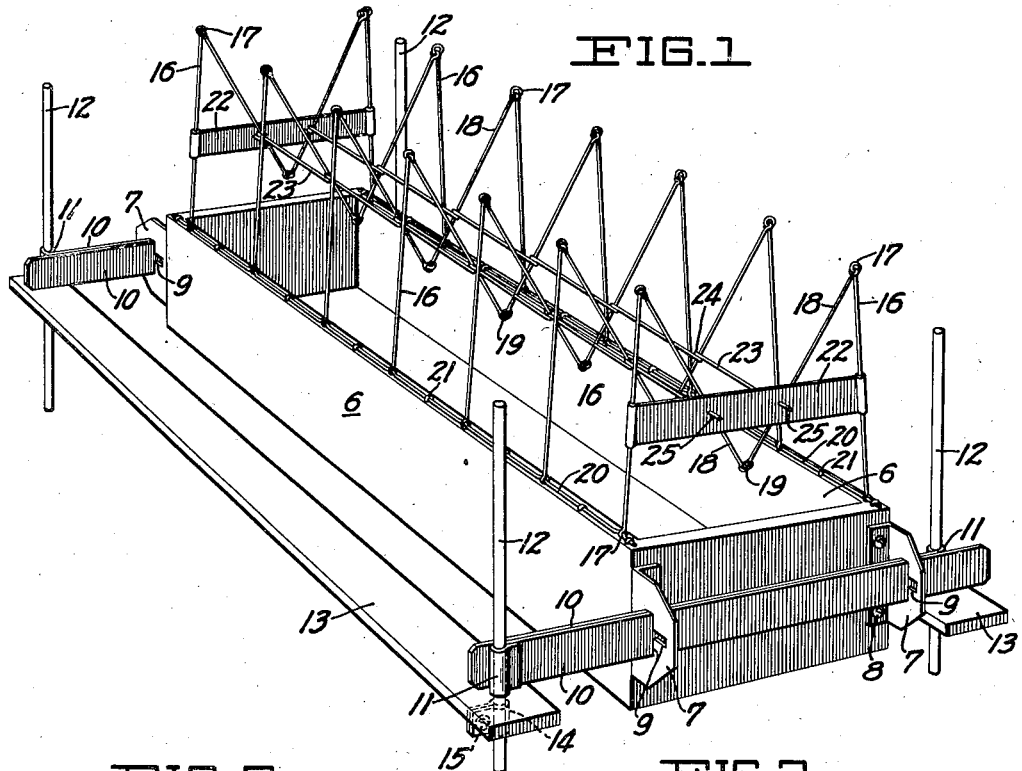
Fig. 1
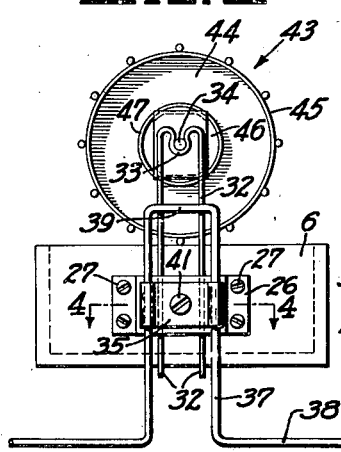
Fig. 2
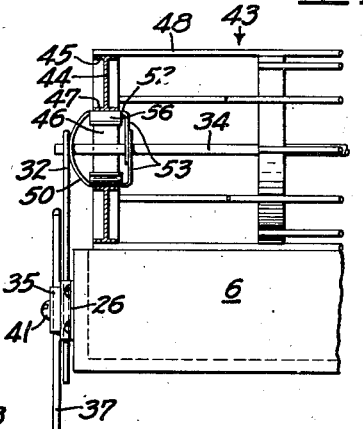
Fig. 3
Fig. 4
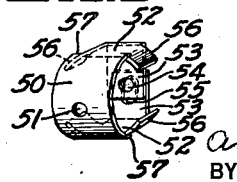
Fig. 5
INVENTOR
Andrew Perrich
BY
Harry P. Schroeder
ATTORNEY Patented May 18, 1937

2,080,672

UNITED STATES PATENT OFFICE 2,080,672

POULTRY FEEDING TROUGH

Andrew Perrich, Hayward, Calif.

Application November 25, 1935, Serial No. 51,346

5 Claims. (Cl. 119—61)

This invention relates to poultry feeding troughs and particularly to means for adjusting the trough to accommodate fowls of different sizes and to guard means to prevent scattering or contamination of the feed by the fowls.

It is an object of the invention to provide a feeding trough which may be adjusted to accommodate fowls during various stages of their growth; to provide an improved construction for guards used in conjunction with feeding troughs to prevent scattering or contamination of the feed by the fowls and to prevent the latter from perching on the troughs; to provide improved means for mounting such guards on the troughs; to provide improved means for adjusting the guards to fit troughs of varying sizes; and to provide guard means for the troughs described which will offer a minimum of interference with the feeding fowl.

Referring to the drawing:

Figure 1 is a perspective view of a feeding trough incorporating the improvements of the invention and equipped with a stationary guard.

Figure 2 is an end elevation of a trough equipped with a rotary guard.

Figure 3 is a side elevation of the device of Figure 2.

Figure 4 is an enlarged cross-sectional view of the guard clamping means. The plane of section is indicated by the line 4—4 of Figure 2.

Figure 5 is a perspective view of the rotary guard attachment clip.

In detail, the invention comprises a rectangular trough 6, preferably made of wood and provided at each end with angle brackets 7 suitably secured to the trough by means of screws 8. Each of the brackets is provided with a pair of intersecting rectangular apertures 9 in which is slidably mounted a pair of bars 10 each having a loop 11, formed at one end thereof, which slidably engages a cylindrical standard 12. One of these standards is provided adjacent each corner of the trough and may be supported by being driven into the ground. A perch 13, having apertures provided adjacent its ends which engage the standards, is disposed between the standards along each longitudinal side of the trough and a clamp collar 14 is provided on each standard below the perch. Each of the clamp collars is provided with a screw 15 by means of which the collar may be secured to the standard.

It will thus be seen that by spacing the standards 12 apart transversely of the trough the desired amount, the perches 13 may be adjustably spaced from the sides of the trough, and, by raising or lowering the clamp collars 14 on each standard, the height above the ground of both the perches and the trough may be regulated.

It is obviously desirable, in feeding baby chicks, that the edges of the feeding trough be positioned a minimum distance above the ground, therefore, in this case, all of the fittings except the angle brackets 7 are removed from the trough and the latter is placed directly upon the ground. However as the fowls mature it is desirable, in order to prevent the entrance into the trough of matter which would contaminate the feed therein, such as mud and body waste matter lodged in the feathers of the fowls, to elevate the trough and provide perches spaced therefrom a distance sufficient to prevent any portion of the body of the fowl, other than the head and neck, from reaching the trough. This elevation of the trough is further desirable if fowls in various stages of development are kept in the same pen, since it is sometimes advantageous to provide different feed for the chicks and those of the fowls which have reached the flying stage. It is thus possible to prevent the chicks from reaching the feed in the elevated trough, intended for the larger fowl.

One of the major causes of feed wastage by fowls, particularly when they are fed from troughs, is due to the tendency of the fowls to sort through the feed in search of particularly tempting morsels by flicking the feed from side to side with their beaks. It is evident that, if the trough is full, or nearly so, a considerable quantity of the feed will be cast over the sides thereof and fall to the usually muddy ground around the trough. Since the fowls instinctively know that fresh feed may be found in the trough, when they require it, they ignore the spilled feed with the result that it is soon tramped into the ground and lost.

Means are provided which eliminate, to a great measure, this feed loss due to spillage. As shown in Figure 1, a superstructure is provided on the trough comprising a plurality of M-shaped units each of which is constructed of a pair of wire side legs 16 provided with eyes 17 formed at each end thereof. These eyes engage a pair of downwardly converging wire members 18 which are brought together and secured at their lower ends by means of engaging eyes 19 formed thereon. A plurality of these units are disposed, as shown in the figure, in spaced relationship longitudinally of the trough and are secured thereto by means of a pair of base wires 20 positioned on the upper surface of each of the side walls of the trough, passing through each lower eye of the side legs 16, and secured to the trough by means of staples 21. In order to provide rigidity for this superstructure a strap 22 is provided on the M-shaped unit at each end of the trough, the straps being rigidly attached to the side legs thereof. Further reinforcement is provided in a pair of parallel bracing wires 23 which are provided with spaced loops 24, engaging each of the wire members 18, and with end extensions 25 which pass through spaced apertures formed in each strap 22.

It will be seen that the superstructure just described provides, by means of the spaced angularly related members 18, a V-shaped rack into which feed, such as alfalfa or the like, may be placed so as to support it above the trough 6. Thus the coarser portions of the feed will be retained by the rack and will be prevented thereby from falling into the trough while the finer particles of the feed may fall freely from the main bulk of the coarser feed into the rack.

The spacing, longitudinally of the trough, of the side legs 16 is determined so that the head of a fowl will just pass therebetween. This is done in order to prevent the fowl from flicking the feed with its beak, as was described above, and causing spillage of feed from the trough.

In Figures 2, 3 and 4 a modified form of the invention is shown. Here the trough 6 is provided at each end thereof with a sheet metal bracket 26 which is secured to the trough by screws 27 and provided with an elevated portion 28 which provides a space 29 between the bracket and the trough wall. In this space is disposed a plate 30 provided with a pair of grooves 31, formed in parallel relationship on the surface thereof; and these grooves engage a pair of parallel wires 32 which form the downwardly extending legs of a bracket having a loop 33 formed at the upper end thereof which supports a shaft 34 extending longitudinally above the trough. A plate 35, having a pair of parallel grooves 36 formed in the face thereof, is disposed on the outer face of the bracket 26, and the grooves 36 engage a pair of wires 37 which form the legs of a support provided with ground engaging feet 38 formed as outwardly turned extensions of the wires 37. The upper ends of the wires 37 are secured together by a transversely disposed portion 39 formed integrally therewith. Each of the members 28, 30 and 35 is provided with a central aperture 40 through which passes a screw 41 provided with a nut 42, which is seated in a depression formed in the surface of the trough wall, so as to prevent rotation thereof. It will be seen therefore that, by tightening the screw 41, the various parts may be clamped together to prevent relative movement therebetween.

A rotatable guard, indicated generally by the reference numeral 43, is mounted on the shaft 34 and comprises a plurality of spaced disks 44 each provided with a peripheral flange 45 and a central aperture 46 provided with a marginal flange 47 thereabout. A plurality of wires are provided disposed axially parallel with the shaft 34 and are arranged in separate groups 48 and 49. The wires of the group 48 have their ends secured to the flanges 45 of the first and third disks 44, shown in Figure 3 and reading from left to right, and the wires of the group 49 have their ends secured to the flanges of the second and fourth disks.

It will be seen therefore that the two groups of wires 48 and 49, together with their connected disks, provide a pair of relatively axially movable sections of the guard which may be extended or retracted to accommodate troughs of various lengths.

Means are provided for removably securing the rotatable guard sections to the shaft. In Figure 5 is shown a clip comprising an arcuate spring portion 50 provided with an aperture 51 through which the shaft 34 is adapted to pass. Each end of the arcuate portion 50 is provided with a flattened extension 52, disposed so that they lie parallel to each other, and terminating in downturned portions 53 which lie in overlapping relationship with each other. One of the portions 53 is provided with an aperture 54 and the other with an elongated slot 55, in registry at one end thereof with the aperture 54, so that when the shaft 34 is in position therein, and in the apertures 51 and 54, the resiliency of the arcuate portion 50 tending to spread the portions 52 outwardly will effect clamping of the periphery of the shaft between the lower edge of the aperture 54 and the upper end of the slot 55.

The sides of the flattened portions 52 are provided with arcuate extensions 56 which are curved about a radius equalling that of the aperture 46 of the disk so that they will seat therein, as shown in Figure 3 when the clip is inserted into the aperture. To lock the clip in the aperture, and prevent accidental dislodgement thereof, the extensions 56 are partially sheared from the end of the arcuate portion 50 to provide shoulders 57 which engage the face of the flange 47, when the clip is in place, and prevent movement axially thereof with respect to the disk.

It will be readily seen that the rotary guard just described effectively prevents fowls from perching in positions above the trough where mud, or other matter contained in their feathers, or body waste, will drop into the trough and contaminate the feed therein.

It will also be seen that the rotary guard may be readily removed for replacement or cleaning by compressing the arcuate portion 50 of the clip, whereupon the shaft 34 is released, and it then may be withdrawn axially from the guards leaving the latter free to be lifted from the trough. The height of the guard above the trough may be adjusted by loosening the screw 41 and sliding the wires 32 axially in the grooves of the plate 30 and likewise the height of the trough above the ground may be adjusted by sliding the wires 37 relative to the plate 35. When the desired adjustment has been obtained the screw 41 may be again tightened which will clamp the parts together and prevent further relative movement therebetween.

From the foregoing description of the invention it will be seen that there has been provided a feeding trough for poultry which may readily be adjusted to accommodate the fowls during the various stages of their growth; one which prevents waste and contamination of the feed; and one which may be manufactured to sell for an extremely moderate price.

What I claim is:

1. The combination, in a poultry feeding device, of a trough, a bracket rising from each end of said trough, a cylindrical wire guard member rotatably mounted at each end thereof in said brackets, a pair of legs depending from said trough at each end thereof and disposed adjacent said brackets, said legs having outwardly directed portions thereof for engaging the ground, and means common to both said brackets and said legs for securing these members to said trough.

2. The combination, in a poultry feeding device, of a trough, a bracket rising from each end of said trough, a cylindrical wire guard member comprising a pair of axially movable sections rotatably mounted at each end thereof in said brackets, a pair of legs depending from said trough at each end thereof and disposed adjacent said brackets, said legs having outwardly directed portions thereof for engaging the ground, and means common to both said brackets and said legs for securing these members to said trough.

3. The combination, in a poultry feeding device, of a trough, a pair of brackets rising from positions adjacent each end of said trough, each of said brackets comprising a length of wire bent to provide a looped portion positioned above said trough and a pair of parallelly disposed support portions extending downwardly therefrom in positions spaced from the end of said trough, a wire member bent to provide a pair of parallel legs disposed adjacent said support portions and in spaced relationship therewith, a bracket secured to each end of said trough and having an offset portion thereof passing between said spaced legs and support portions, a plate having grooves therein for engaging said support portions disposed on one side of said offset portion of the bracket, a plate having grooves therein for engaging said legs disposed on the other side of said bracket, and a screw passing through said plates and said offset portion of the bracket for clamping the legs and the support portions to said bracket.

4. The combination, in a poultry feeding device, of a trough, a bracket rising from each end of said trough, a shaft journalled in said brackets, a cylindrical guard having a central aperture therein disposed in axial alinement with said shaft, and means for removably mounting said guard on said shaft, said means comprising a flexible metallic strip having an arcuately curved portion provided with an aperture for engaging said shaft, a pair of parallel extensions of said curved portion for engaging the aperture in said guard, and a pair of contiguously disposed arms formed integrally with said parallel extensions and provided with alined apertures for frictionally engaging said shaft.

5. The combination, in a poultry feeding device, of a trough, a bracket rising from each end of said trough, a shaft journalled in said brackets, a cylindrical guard disposed in axial alinement with said shaft, said guard comprising a plurality of axially alined disks having central apertures therein, a plurality of parallel wires disposed in spaced relationship around the peripheries of said disks and separated into groups having their ends secured to the peripheries of alternate disks, and resilient means disposed in the apertures of a pair of said disks and frictionally engaging said shaft.

ANDREW PERRICH.